United States Patent
Tu et al.

(10) Patent No.: US 8,971,388 B2
(45) Date of Patent: Mar. 3, 2015

(54) RECEIVER AND TRANSMITTER APPARATUS FOR CARRIER AGGREGATION

(71) Applicant: Industrial Technology Research Institute, Hsinchu (TW)

(72) Inventors: Chia-Hao Tu, Tainan (TW); Chang-Ming Lai, Chiayi (TW); Jian-Yu Li, Pingtung County (TW)

(73) Assignee: Industrial Technology Research Institute, Hsinchu (TW)

( * ) Notice: Subject to any disclaimer, the term of this patent is extended or adjusted under 35 U.S.C. 154(b) by 23 days.

(21) Appl. No.: 13/871,258

(22) Filed: Apr. 26, 2013

(65) Prior Publication Data

US 2014/0169418 A1 Jun. 19, 2014

(30) Foreign Application Priority Data

Dec. 19, 2012 (TW) .............................. 101148481 A

(51) Int. Cl.
| | |
|---|---|
| *H04B 1/38* | (2006.01) |
| *H04B 1/40* | (2006.01) |
| *H04B 1/04* | (2006.01) |
| *H04B 1/16* | (2006.01) |

(52) U.S. Cl.
CPC .. *H04B 1/40* (2013.01); *H04B 1/04* (2013.01); *H04B 1/16* (2013.01)
USPC ...................................................... 375/219

(58) Field of Classification Search
CPC .................................................... H04B 1/0014
USPC ....................................................... 375/219
See application file for complete search history.

(56) References Cited

U.S. PATENT DOCUMENTS

| | | | |
|---|---|---|---|
| 6,563,859 B1 | 5/2003 | Oishi et al. | |
| 6,871,052 B2* | 3/2005 | Spencer et al. | ............ 455/226.2 |
| 7,079,596 B1* | 7/2006 | Namura | ......................... 375/324 |
| 7,286,613 B2* | 10/2007 | Baron et al. | .................. 375/296 |

(Continued)

FOREIGN PATENT DOCUMENTS

TW 201119323 A 6/2011

OTHER PUBLICATIONS

Lai et al., "Compact Router Transceiver Architecture for Carrier Aggregation Systems", Microwave Conference (EuMC), 2011 41st European, p. 693-p. 696, Oct. 2011.

(Continued)

*Primary Examiner* — Santiago Garcia
(74) *Attorney, Agent, or Firm* — Rabin & Berdo, P.C.

(57) ABSTRACT

An RF receiver/transmitter apparatus for carrier aggregation is disclosed, to provide a routing circuitry formed by a plurality of mixer modules for achieving both the function of carrier aggregation and the mixing frequency process of signals. This architecture allows sharing an RF front-end, improving degree of integration, and reducing hardware cost and circuitry power consumption. In addition, in the process of reception and transmission, the apparatus may perform different processing and configuration for each sub-channel to increase circuit design flexibility. The receiver apparatus includes at least one antenna, a first signal processing unit, a routing mixer device, a second signal processing unit and a digital signal processor (DSP); and the routing mixer device includes a plurality of mixer module and a plurality of current/voltage adders to achieve signal routing control through opening or closing of the mixer, switching the signal transmission path or switching the signal synthesizer.

17 Claims, 11 Drawing Sheets

(56) References Cited

U.S. PATENT DOCUMENTS

| | | | |
|---|---|---|---|
| 7,299,020 B2 | 11/2007 | Shen et al. | |
| 7,869,528 B2* | 1/2011 | Robinson | 375/260 |
| 7,978,782 B2* | 7/2011 | Rofougaran | 375/271 |
| 8,036,308 B2* | 10/2011 | Rofougaran | 375/300 |
| 8,059,706 B2* | 11/2011 | Rofougaran | 375/230 |
| 8,077,670 B2 | 12/2011 | Fan et al. | |
| 8,085,877 B2* | 12/2011 | Rofougaran | 375/324 |
| 8,238,495 B2* | 8/2012 | Berens | 375/346 |
| 8,284,822 B2* | 10/2012 | Rofougaran | 375/219 |
| 8,324,962 B2* | 12/2012 | Mulvaney | 329/302 |
| 8,379,698 B2* | 2/2013 | Murray et al. | 375/219 |
| 2003/0095607 A1* | 5/2003 | Huang et al. | 375/296 |
| 2007/0004453 A1* | 1/2007 | Kim et al. | 455/557 |
| 2008/0278370 A1* | 11/2008 | Lachner et al. | 342/200 |
| 2010/0041385 A1* | 2/2010 | Kim et al. | 455/419 |
| 2011/0235749 A1* | 9/2011 | Kenington | 375/296 |
| 2011/0275359 A1 | 11/2011 | Sebire et al. | |
| 2011/0299618 A1* | 12/2011 | Hammerschmidt et al. | 375/267 |
| 2012/0044976 A1* | 2/2012 | Lai et al. | 375/219 |
| 2012/0099623 A1* | 4/2012 | Petrovic et al. | 375/211 |
| 2012/0213154 A1 | 8/2012 | Gaal et al. | |
| 2013/0029611 A1* | 1/2013 | Kim et al. | 455/73 |
| 2013/0058439 A1* | 3/2013 | Lin | 375/340 |
| 2013/0128931 A1* | 5/2013 | Lin et al. | 375/219 |

OTHER PUBLICATIONS

Pedersen et al., "Carrier aggregation for LTE-advanced: functionality and performance aspects", Communications Magazine, IEEE, p. 89-p. 95, Jun. 2011.

Fu et al., "Multicarrier technology for 4G WiMax system", Communications Magazine, IEEE, p. 50-p. 58, Aug. 2010.

Parkvall et al., "Evolution of LTE toward IMT-advanced", Communications Magazine, IEEE, p. 84-p. 91, Feb. 2011.

Ghosh et al., "LTE-advanced: next-generation wireless broadband technology", Wireless Communications, IEEE, p. 10-p. 22, Jun. 2010.

Shen et al., "Overview of 3GPP LTE-advanced carrier aggregation for 4G wireless communications", IEEE Communications Magazine, p. 122-p. 130, Feb. 2012.

Taiwan Patent Office, Notice of Allowance, Patent Application Serial No. TW101148481, Oct. 24, 2014, Taiwan.

* cited by examiner

US 8,971,388 B2

RECEIVER AND TRANSMITTER APPARATUS FOR CARRIER AGGREGATION

CROSS-REFERENCE TO RELATED APPLICATION

The present application is based on, and claims priority form, Taiwan Patent Application No. 101148481, filed Dec. 19, 2012, the disclosure of which is hereby incorporated by reference herein in its entirety.

TECHNICAL FIELD

The technical field generally relates to a receiver and transmitter apparatus for carrier aggregation.

BACKGROUND

As the wireless communication technology progresses, more users use smart phones and tablets to connect to the Internet. Compared to conventional PC, portable devices provide a better anytime and anywhere model for Internet access.

Many network applications demand high speed and real-time, which means that the demands on the bandwidth will be increasing. For the ever-increasing demands on bandwidth, two problems will surface. The first is the difficulty to obtain a single continuous wideband, and the second is the new transmission means must be compatible to the existing specification so that the existing devices can continue to enjoy the wireless network service. Therefore, the carrier aggregation technique is proposed to solve the above problems. The carrier aggregation technique can aggregate different bands for common transmission to achieve an equivalent bandwidth sufficiently large to provide high speed wireless network service. The hardware able to achieve carrier aggregation can also be compatible to the existing wireless communication specification with some simple control. Therefore, the carrier aggregation technique is becoming the standard adopted by the mainstream Long Term Evolution Advanced (LTE-A).

The carrier aggregation can be divided into two categories: intra-band carrier aggregation and inter-band carrier aggregation. FIG. 1 shows a schematic view of carrier aggregation, wherein FIG. 1A shows an embodiment of an intra-band carrier aggregation, FIG. 1B shows another embodiment of an intra-band carrier aggregation and FIG. 1C shows an embodiment of an inter-band carrier aggregation. The intra-band carrier aggregation in FIG. 1A is to aggregate two adjacent sub-bands of band A and view as a single enlarged channel. In this embodiment, each terminal device only requires a transceiver. The intra-band carrier aggregation in FIG. 1B is to aggregate two sub-bands that are not adjacent to each other in band A. In this embodiment, each terminal device requires a plurality of transceivers, with each transceiver corresponding to each non-adjacent sub-band for transceiving. The inter-band carrier aggregation in FIG. 1C is to aggregate two sub-bands belonging to different bands. Similarly, in this embodiment, each terminal device requires a plurality of transceivers, with each transceiver corresponding to each non-adjacent sub-band for transceiving.

As aforementioned, when the conventional RF transceiver is required to transmit and receive a plurality of signals, the most common approach is to dispose a plurality of RF transceivers, and each transceiver is designed for the target bandwidth. For carrier aggregation technique, each band may use a plurality of carriers, and a plurality of transceivers with a largest bandwidth must be disposed. In actual operation, when the transmission of a plurality of carriers concentrates in a specific band, the other bands will be allocated with a smaller bandwidth because of the restriction of the total bandwidth. At this point, the design of reserving the maximum bandwidth for each transceiver of each band will be wasted in terms of hardware and power.

The known technique provides various solutions for the above problem. For example, a known technique uses router-type switch to switch signal path to achieve sharing the RF front-end. Compared to the conventional parallel disposition, this technique can reduce hardware and power waste. However, because the router-type switch performs switching on the RF transmission path and the RF signal is sensitive to the scattering effect in a chip, this technique requires using a larger area for passive elements, such as, planar inductor, to achieve the design object. Thus, the chip cost cannot be effectively reduced.

Another known technique is to use two sets of RF front-ends, with each RF front-end designed for each band. Although this structure is applicable to multi-band communication system, the circuit after the first downclocking is unable to perform concurrent transmission. Thus, this technique is unable to perform cross-band multi-carrier aggregation transmission.

Yet another technique is to use only a transceiver, and the signals from different carriers are separated by digital filtering and demodulation after the signals are converted from analog to digital. This structure requires less analog circuit elements, but has a higher demand on analog-to-digital converter (ADC). The bandwidth required by the ADC is not only the sum of bandwidths of carriers. Instead, all the frequencies between the carrier frequencies must be linearly converted into digital signal to avoid inter-carrier signal quality problem caused by non-linear factor. Besides, when the distance between carrier frequencies is larger, the channel attenuation experienced by each carrier will be different. Therefore, this technique has a high demand on the dynamic range of the ADC, and causes higher hardware cost when applied to cross-band multi-channel.

In yet another technique, the signal path of each carrier passes different RF front-end and is multiplexed to the input of the ADC. In this process, a part of high bandwidth demand is resolved. The frequency gap between carriers can be eliminated by using different downclocking frequency to reduce the bandwidth requirement by the ADC. However, the bandwidth requirement is still higher than the sum of the bandwidths of the carriers.

SUMMARY

The present disclosure is to overcome the aforementioned problems in the known techniques. The present disclosure provides a switching circuit formed by a plurality of mixer modules to achieve the carrier aggregation and signal mixing process simultaneously. This structure allows sharing of the RF front-end, improves chip integration, and reduces the hardware cost and circuit power consumption. In addition, during receiving and transmission, different processing and disposition can be used for each carrier sub-band to enhance circuit design flexibility.

An exemplary embodiment describes a receiver apparatus for carrier aggregation, including: at least an antenna, a first signal processing unit, a routing mixer device, a second signal processing unit and a digital signal processor (DSP), wherein the at least an antenna being configured to receive signals; the first signal processing unit being connected to the at least an antenna and configured to process the signals received by the at least an antenna, the processing including overclocking, downclocking, noise suppression, increasing and lowering of signal level, and so on; the routing mixer device further including a plurality of mixer modules and a plurality of current/voltage adders; the second signal processing unit being connected to the routing mixer device and configured to process signals from the routing mixer device, the processing including overclocking, downclocking, noise suppression, increasing and lowering of signal level, signal demodulation, signal domain conversion, and so on; and the DSP being connected to the second signal processing unit and configured to perform subsequent signal processing.

Another embodiment describes a transmitter apparatus for carrier aggregation, including: a digital signal processor (DSP), a third signal processing unit, a routing mixer device and a fourth signal processing unit; wherein the DPS being configured to output signal; the third signal processing unit being connected to the DSP and configured to process the signals outputted by the DSP, the processing including overclocking, downclocking, noise suppression, increasing and lowering of signal level, signal modulation, signal domain conversion, and so on; the routing mixer device further including a plurality of mixer modules and a plurality of current/voltage adders; the fourth processing unit being connected to the routing mixer device and configured to process signals from the routing mixer device, the processing including overclocking, downclocking, noise suppression, increasing and lowering of signal level, and so on. The signal processed by the fourth processing unit can be fed to antenna for transmission.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

Figure 1C:
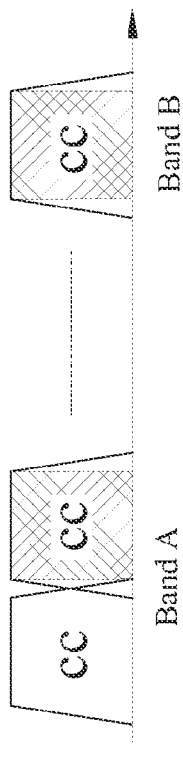
FIG. 1C shows an embodiment of an inter-band carrier aggregation.
Figure 1A:
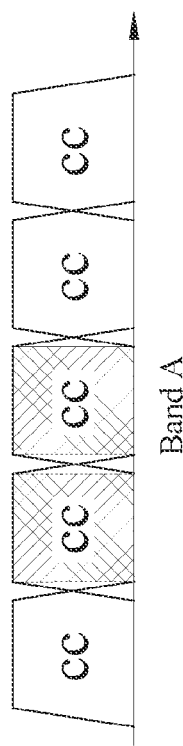
FIG. 1A shows an embodiment of an intra-band carrier aggregation.
Figure 1B:
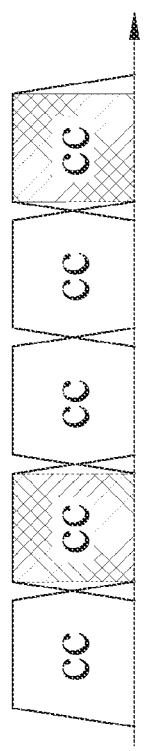
FIG. 1B shows another embodiment of an intra-band carrier aggregation.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
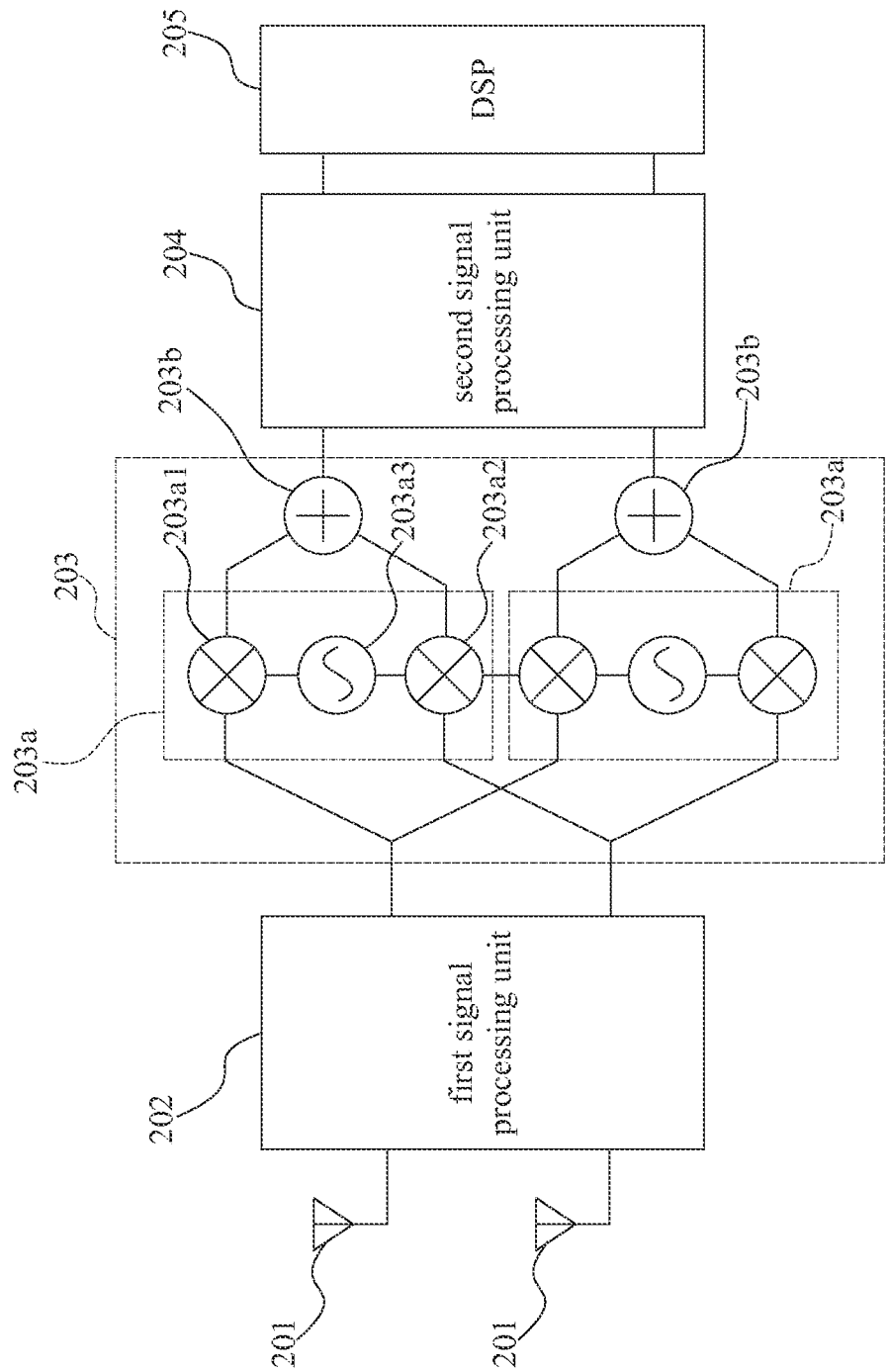
FIG. 2 shows a schematic view of a receiver apparatus for carrier aggregation according to the first embodiment of the present disclosure.

FIG. 2 shows a schematic view of a receiver apparatus for carrier aggregation according to the first embodiment of the present disclosure. As shown in FIG. 2, the embodiment uses two antennas as example, while in actual applications one or more antennas can be used. The receiver apparatus for carrier aggregation includes at least an antenna 201, a first signal processing unit 202, a routing mixer device 203, a second signal processing unit 204 and a digital signal processor (DSP) 205. The at least an antenna 201 is configured to receive signals. The first signal processing unit 202 is connected to the at least an antenna 201 and is configured to process the signals received by the at least an antenna 201, wherein the processing may include overclocking, downclocking, noise suppression, increasing and lowering of signal level, and so on. The routing mixer device 203 is a device with M inputs and N outputs, and further includes a plurality of mixer modules and a plurality of current/voltage adders. In the instant embodiment, the routing mixer device 203 includes two inputs and two outputs (i.e., M=2, N=2). The second signal processing unit 204 is connected to the routing mixer device 203 and is configured to process signals from the routing mixer device 203, wherein the processing may include overclocking, downclocking, noise suppression, increasing and lowering of signal level, signal demodulation, signal domain conversion, and so on. The DSP 205 is connected to the second signal processing unit 204 and is configured to perform subsequent signal processing.

It should be noted that, according to carrier aggregation application, the system must be compatible to the transmission and receiving of a single carrier. Therefore, the signals received by the at least an antenna 201 can be signals of a single carrier or a plurality carriers. The routing mixer device 203 includes a plurality of mixer modules and a plurality of current/voltage adders. By controlling the ON and OFF of the mixers in each module, various scenarios can be realized, for example, no output, any one output or any multiple outputs at the output ends of the current/voltage adders. Take the two inputs and two outputs as example (M=2, N=2). The routing mixer device 203 of the embodiment includes two mixer modules 203a and two current/voltage adders 203b; wherein the mixer module includes a first mixer 203a1, a second mixer 203a2 and a signal synthesizer 203a3. The two input terminals of the first mixer 203a1 are connected respectively to a first input signal and the signal synthesizer 203a3. The two input terminals of the second mixer 203a2 are connected respectively to a second input signal and the signal synthesizer 203a3. In other words, the first mixer 203a1 mixes the first input signal and signal from the signal synthesizer 203a3 and outputs a first output signal; and the second mixer 203a2 mixes the second input signal and signal from the signal synthesizer 203a3 and outputs a second output signal. In the instant embodiment, the connection of the routing mixer device 203 is as follows: the first input signals of the two mixer modules are both connected to an output of the first processing unit 202; the second input signals of the two mixer modules are both connected to the other output of the first processing unit 202; the first output signal and the second output signal of each mixer module are both connected to a current/voltage adder, and the added signal is outputted to the second signal processing unit 204. As such, the routing mixer device 203 can mix and add the output signals of the first signal processing unit 202 and propagates to the second signal processing unit 204 in a routing manner.

Figure 3:
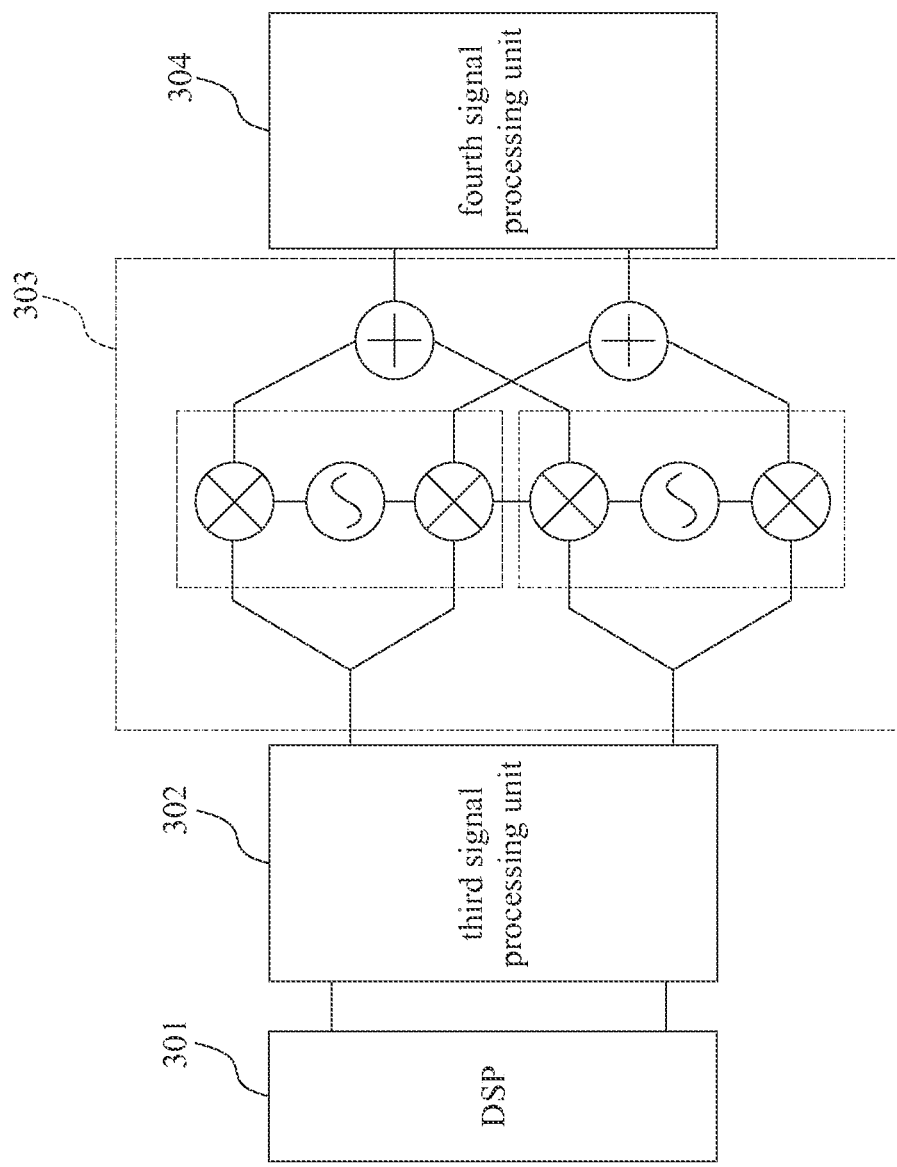
FIG. 3 shows a schematic view of a transmitter apparatus for carrier aggregation according to the second embodiment of the present disclosure.

FIG. 3 shows a schematic view of a transmitter apparatus for carrier aggregation according to the second embodiment of the present disclosure. As shown in FIG. 3, the transmitter apparatus for carrier aggregation includes a digital signal processor (DSP) 301, a third signal processing unit 302, a routing mixer device 303 and a fourth signal processing unit 304. The DPS 301 is configured to output signal. The third signal processing unit 302 is connected to the DSP 301 and is configured to process the signals outputted by the DSP 301, wherein the processing may include overclocking, downclocking, noise suppression, increasing and lowering of signal level, signal modulation, signal domain conversion, and so on. The routing mixer device 303 is a device with M inputs and N outputs, and further includes a plurality of mixer modules and a plurality of current/voltage adders. In the instant embodiment, the routing mixer device 203 includes two inputs and two outputs (i.e., M=2, N=2). The fourth processing unit 304 is connected to the routing mixer device and is configured to process signals from the routing mixer device 303, wherein the processing may include overclocking, downclocking, noise suppression, increasing and lowering of signal level, and so on. The signal processed by the fourth processing unit 304 can be fed to antenna (not shown) for transmission.

It should be noted that, the number of output signals from the DSP 301 in the present embodiment is two, and the actual application may use two, four or more sets of signals. Furthermore, the processing performed by the third signal processing unit 302 must match the processing performed by the second signal processing unit 204 in the first embodiment; and the processing performed by the fourth signal processing unit 304 must match the processing performed by the first signal processing unit 202 in the first embodiment. In the present embodiment, the routing mixer device 303 is similar to the routing mixer device 203 in the first embodiment, and also includes two mixer modules and two current/voltage adders. The difference is that the routing mixer device 303 of the present embodiment is connected as follows: the first input signal and the second input signal of each mixer module are both connected to an output of the third processing unit 302; the first output signals of the two mixer modules are both connected to a current/voltage adder, and the added signal is then outputted to the fourth processing unit 304; the second output signals of two mixer modules are both connected to the other current/voltage adder, and the added signal is outputted to the fourth signal processing unit 304. As such, the routing mixer device 303 can mix and add the output signals of the third signal processing unit 302 and propagates to the fourth signal processing unit 304 in a routing manner.

Figure 4:
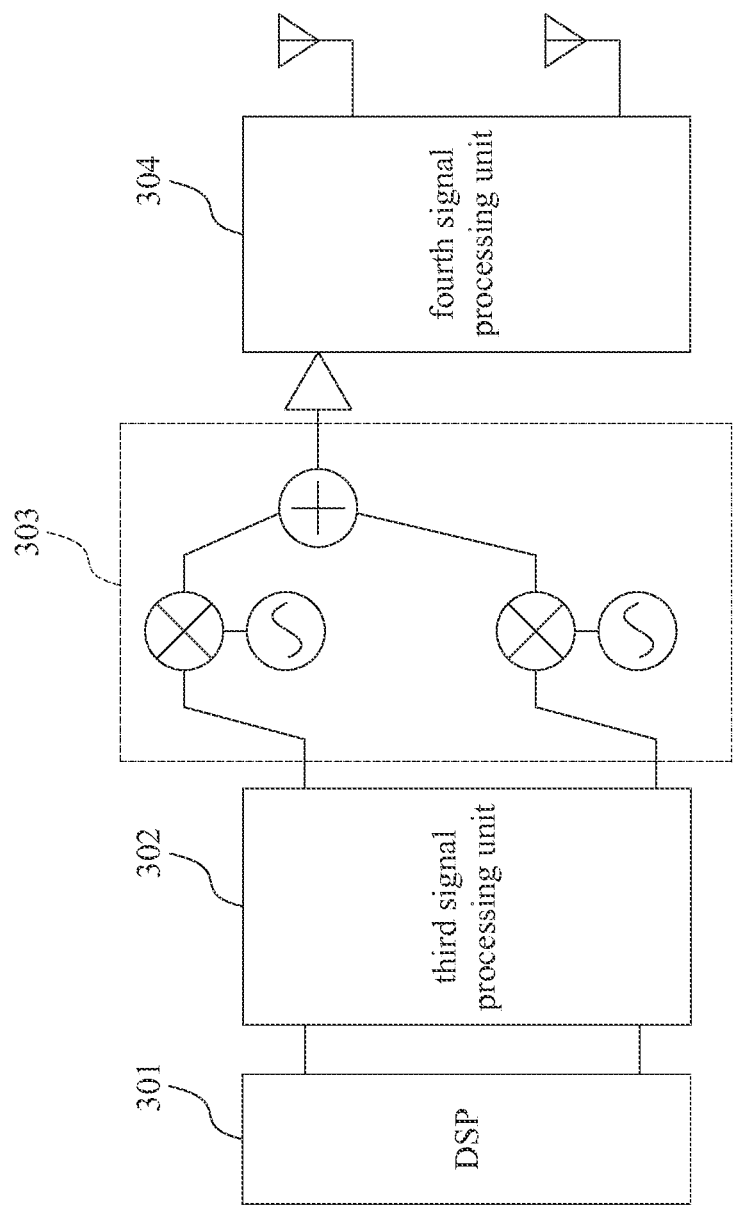
FIG. 4 shows an embodiment of the routing mixer device achieving intra-band carrier aggregation by turning ON and OFF of the mixers.
Figure 5:
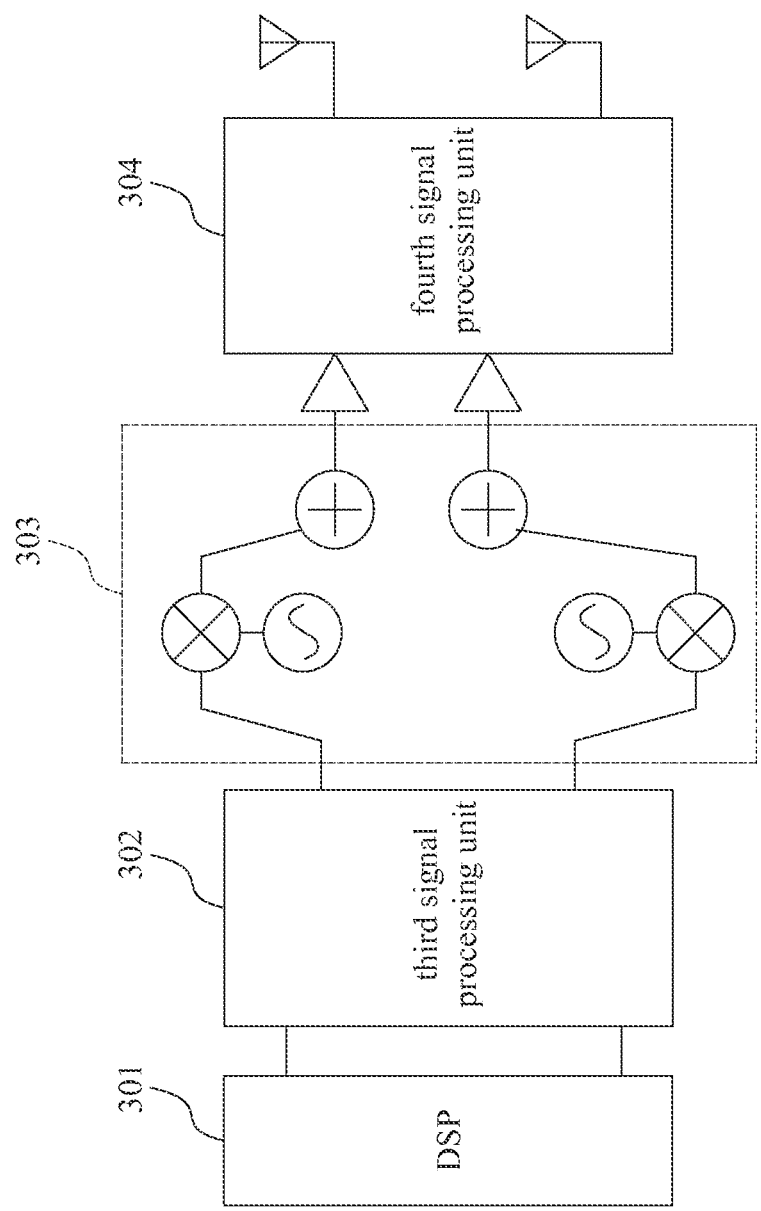
FIG. 5 shows an embodiment of the routing mixer device achieving inter-band carrier aggregation by turning ON and OFF of the mixers.
Figure 6:
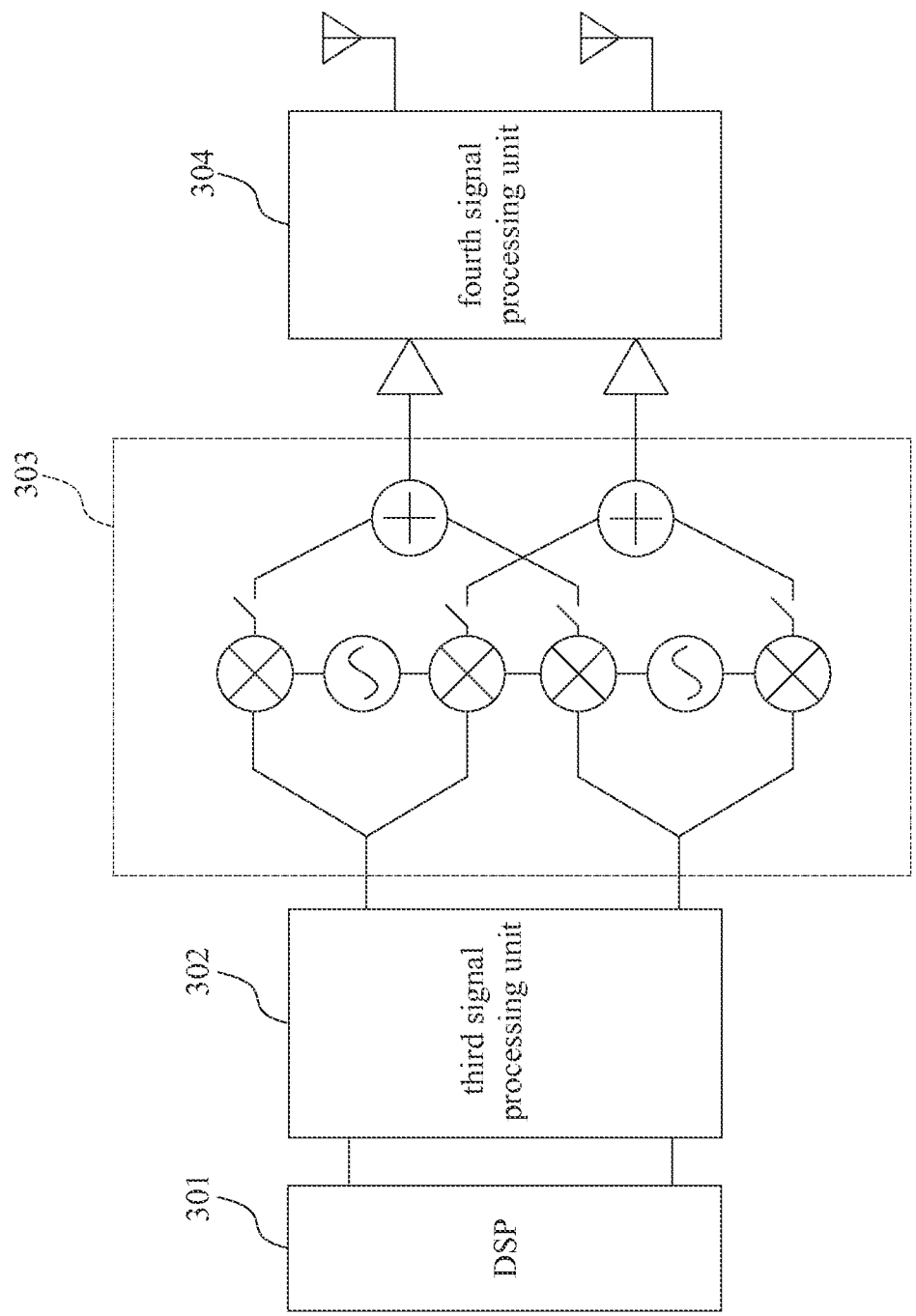
FIG. 6 shows an embodiment of the routing mixer device achieving intra-band carrier aggregation by switching signal transmission path.
Figure 7:
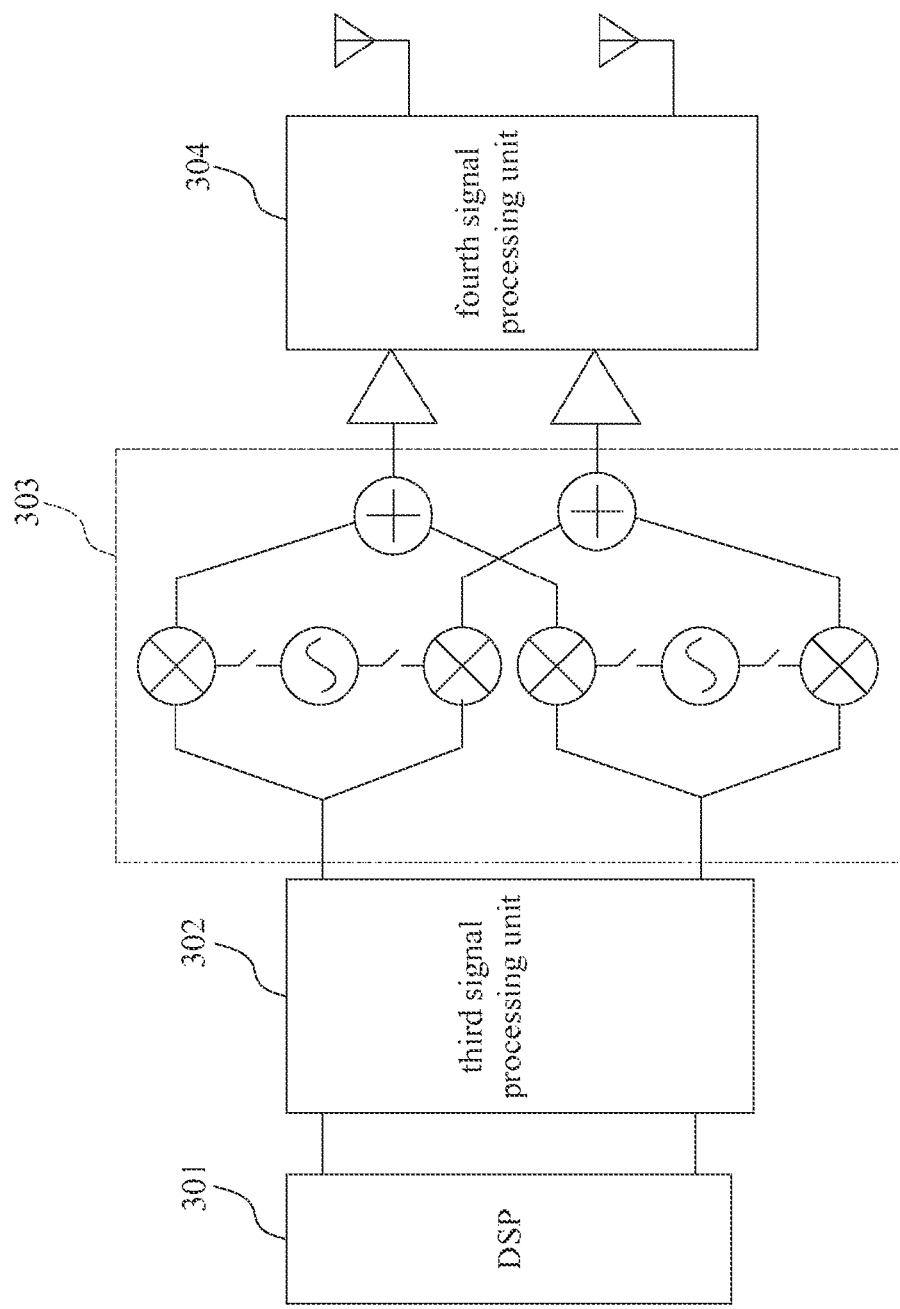
FIG. 7 shows an embodiment of the routing mixer device achieving intra-band carrier aggregation by switching signal of signal synthesizer.

As aforementioned, the routing mixer device can achieve the object of signal routing control by turning ON and OFF of the mixers, switching transmission path of signal, or switching signals of signal synthesizer. FIG. 4-FIG. 7 show schematic views of embodiments of routing control of the routing mixer device of the transmitter apparatus for carrier aggregation in FIG. 3, wherein FIG. 4 shows an embodiment of the routing mixer device achieving intra-band carrier aggregation by turning ON and OFF of the mixers; FIG. 5 shows an embodiment of the routing mixer device achieving inter-band carrier aggregation by turning ON and OFF of the mixers; FIG. 6 shows an embodiment of the routing mixer device achieving intra-band carrier aggregation by switching signal transmission path; and FIG. 7 shows an embodiment of the routing mixer device achieving intra-band carrier aggregation by switching signal of signal synthesizer. As shown in FIG. 4, by turning on the first mixer of two mixer modules of the routing mixer device and turning off the second mixer of two mixer modules of the routing mixer device, the first input signal and the second input signal, after processing, are outputted by the first output signal of two mixer modules to the fourth signal processing unit 304 to achieve the operation of intra-band carrier aggregation. Similarly, as shown in FIG. 5, by turning on the first mixer in one mixer module and the second mixer in the other mixer module, and turning off the second mixer in one mixer module and the first mixer in the other mixer module, the first input signal and the second input signal, after processed, are outputted respectively by the first output signal of one mixer module and the second output signal of the other mixer module to the fourth processing unit 304 to achieve the operation of inter-band carrier aggregation. As shown in the embodiment of FIG. 6, a switch is disposed respectively on the path of the first output signal and the path of the second output signal. By controlling the switches, the switching signal transmission path can achieve the object of inter-band carrier aggregation. In the embodiment of FIG. 7, a switch is disposed respectively between the signal synthesizer and the first mixer, and between the synthesizer and the second mixer of the two mixer modules. By controlling the switches, the switching of the signal of signal synthesizer can achieve the object of inter-band carrier aggregation.

Figure 8:
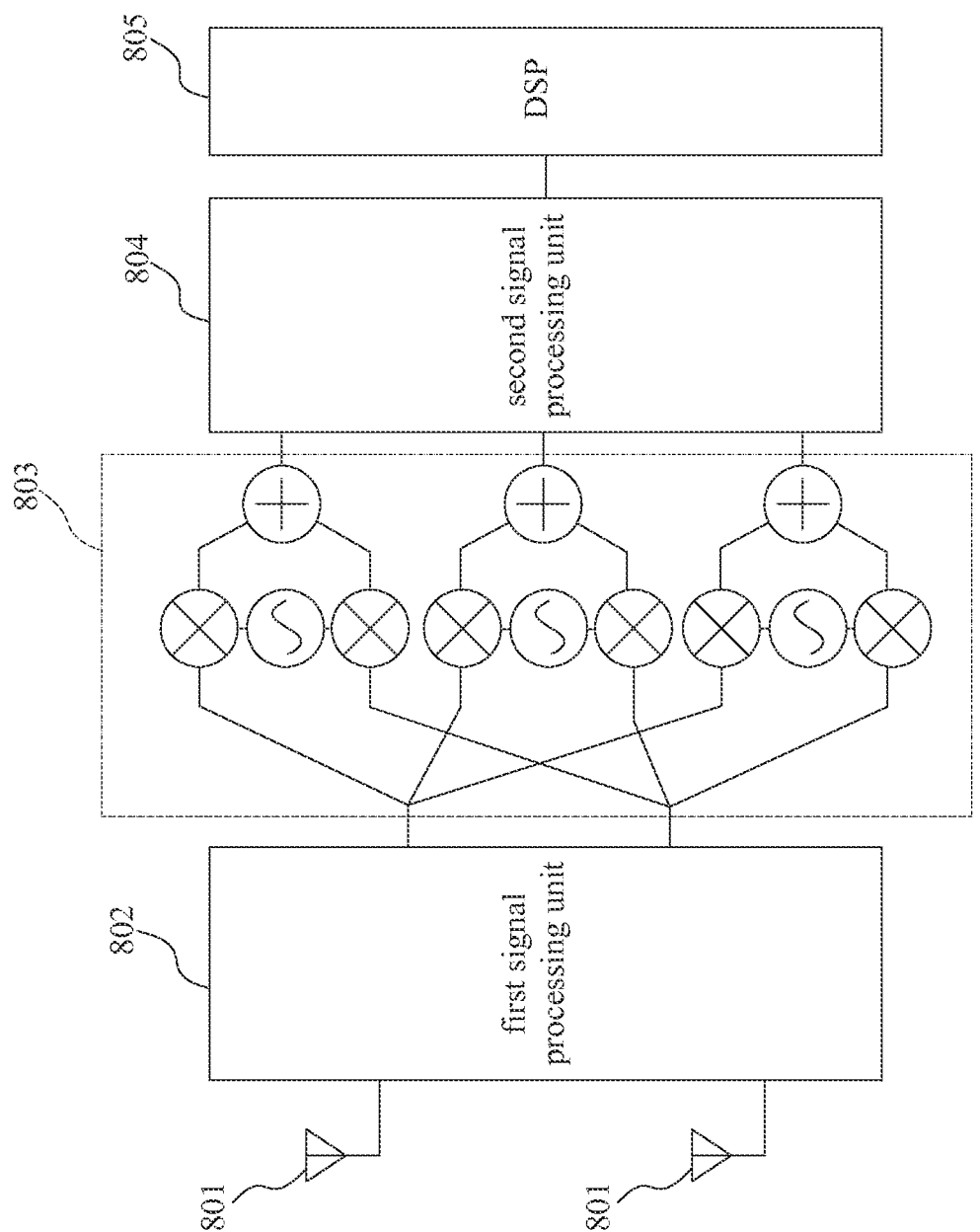
FIG. 8 shows a schematic view of a receiver apparatus for carrier aggregation of the third embodiment of the present disclosure.

FIG. 8 shows a schematic view of a receiver apparatus for carrier aggregation of the third embodiment of the present disclosure. The difference of the present embodiment and the first embodiment in FIG. 2 is that the routing mixer device of the present embodiment includes two inputs and three outputs (i.e., M=2, N=3). Specifically, the routing mixer device includes three mixer modules and three current/voltage adders; wherein each mixer module includes a first mixer, a second mixer and a signal synthesizer. The two input terminals of the first mixer are connected respectively to a first input signal and the signal synthesizer, and the two input terminals of the second mixer are connected respectively to a second input signal and the signal synthesizer. In other words, the first mixer mixes the first input signal and the signal from the signal synthesizer and outputs a first output signal; and the second mixer mixes the second input signal and the signal from the signal synthesizer and outputs a second output signal. In the instant embodiment, the connection of the routing mixer device 803 is as follows: the first input signals of the three mixer modules are all connected to an output of the first processing unit 802; the second input signals of the three mixer modules are all connected to the other output of the first processing unit 802; the first output signal and the second output signal of each mixer module are both connected to a current/voltage adder, and the added signal is outputted to the second signal processing unit 804. As such, the routing mixer device 803 can mix and add the output signals of the first signal processing unit 802 and propagates to the second signal processing unit 804 in a routing manner.

Figure 9:
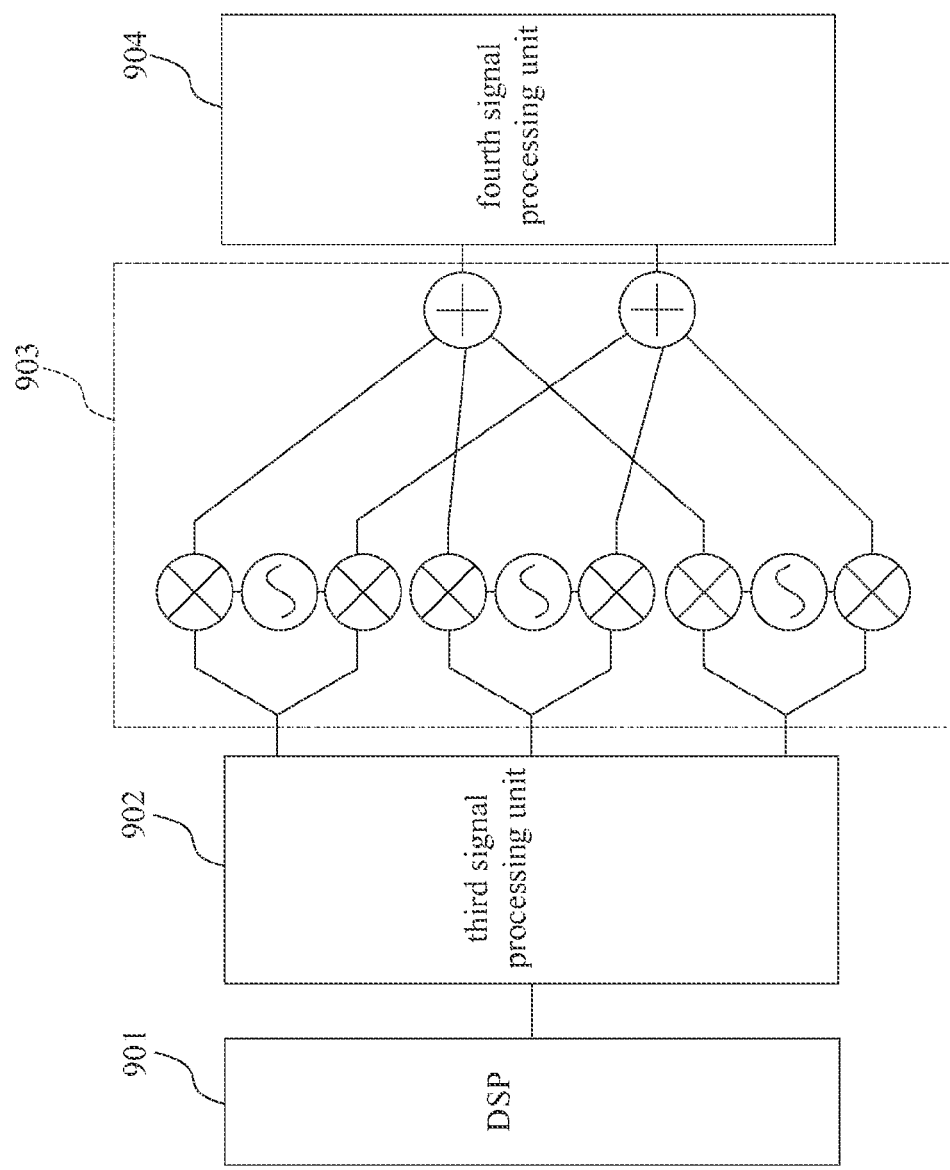
FIG. 9 shows a schematic view of a transmitter apparatus for carrier aggregation of the fourth embodiment of the present disclosure.

FIG. 9 shows a schematic view of a transmitter apparatus for carrier aggregation of the fourth embodiment of the present disclosure. The difference of the present embodiment and the second embodiment in FIG. 3 is that the routing mixer device of the present embodiment includes three inputs and two outputs (i.e., M=3, N=2). Specifically, the routing mixer device includes three mixer modules and two current/voltage adders; wherein each mixer module includes a first mixer, a second mixer and a signal synthesizer. The two input terminals of the first mixer are connected respectively to a first input signal and the signal synthesizer, and the two input terminals of the second mixer are connected respectively to a second input signal and the signal synthesizer. In other words, the first mixer mixes the first input signal and the signal from the signal synthesizer and outputs a first output signal; and the second mixer mixes the second input signal and the signal from the signal synthesizer and outputs a second output signal. In the instant embodiment, the connection of the routing mixer device 903 is as follows: the first input signal and the second input signal of each mixer module are both connected to an output of the third processing unit 902; the first output signals of the three mixer modules are all connected to a current/voltage adder, and the added signal is then outputted to the fourth processing unit 904; the second output signals of three mixer modules are all connected to the other current/voltage adder, and the added signal is outputted to the fourth signal processing unit 904. As such, the routing mixer device 903 can mix and add the output signals of the third signal processing unit 902 and propagates to the fourth signal processing unit 904 in a routing manner.

Figure 10:
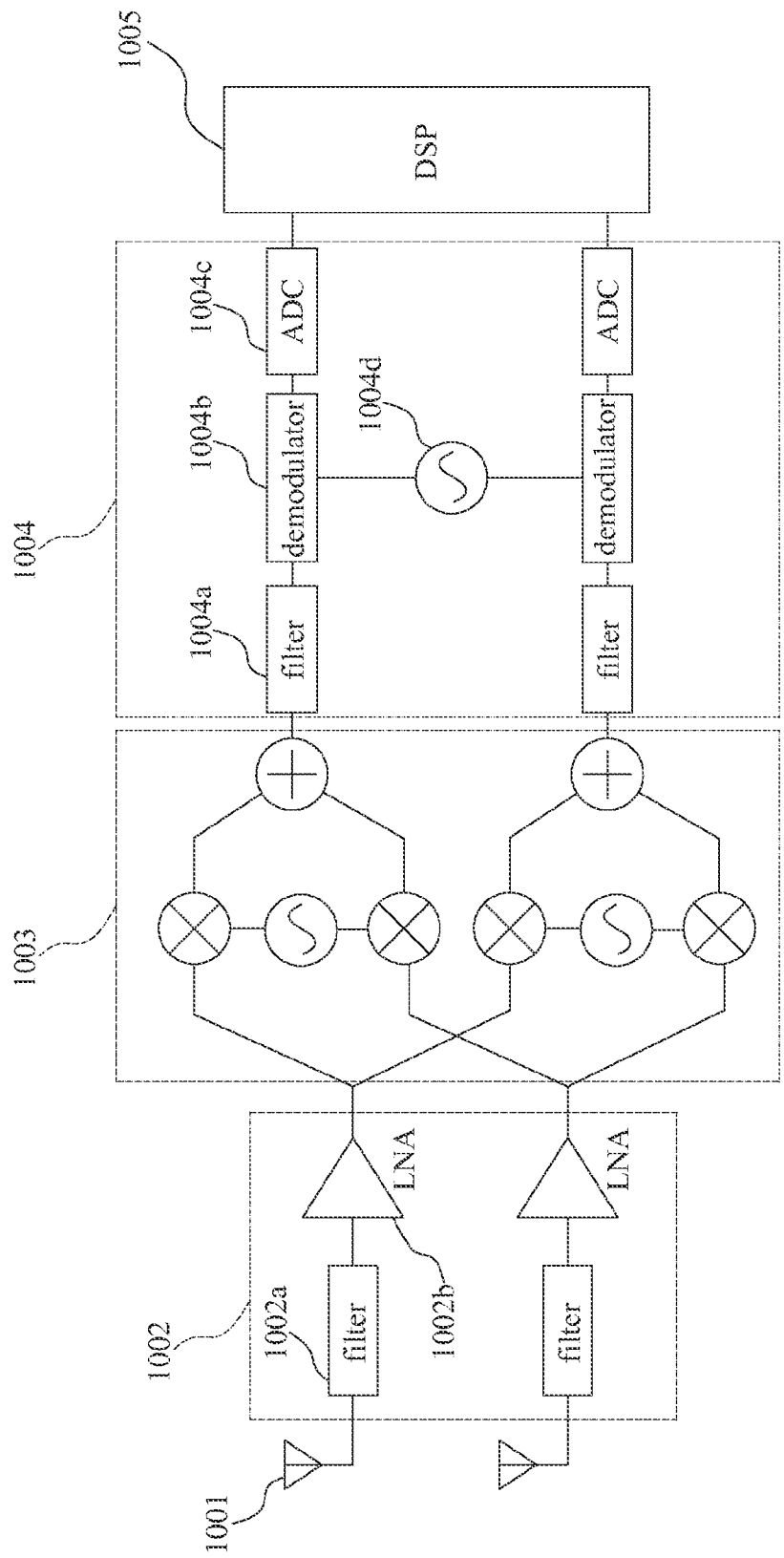
FIG. 10 shows a schematic view of a specific embodiment of the receiver apparatus in FIG. 2.

FIG. 10 shows a schematic view of a specific embodiment of the receiver apparatus in FIG. 2. As shown in FIG. 10, the analog signal is received by the antenna 1001. Based on applications, the received signal can be from a single carrier or a plurality of carriers. The received signal is propagated to a first signal processing unit 1002, wherein the first signal processing unit 1002 can be realized with corresponding filter 1002a and amplifier 1002b. In other words, after the received signal is propagated to the first signal processing unit 1002, the signal is processed by the corresponding filter 1002a and amplifier 1002b. The filter 1002a filters out undesirable noises and the amplifier 1002b can amplify or lower the signal to a suitable level. The signal, after processed by the amplifier 1002b, is transmitted to a routing mixer device 1003. As shown in FIG. 4-FIG. 7, by controlling the ON and OFF of each mixer, or switching signal path, the carrier is determined to mix with the signal provided and downclocked by which signal synthesizer, and to use which current/voltage adder to output to the second signal processing unit 1004, so as to achieve the object of carrier aggregation. The second signal processing unit 1004 can be realized with a filter 1004a, a demodulator 1004b, and an analog-to-digital converter (ADC). The second signal processing unit 1004 can further includes a signal synthesizer 1004d, connected to the demodulator 1004b for second downclocking.

Figure 11:
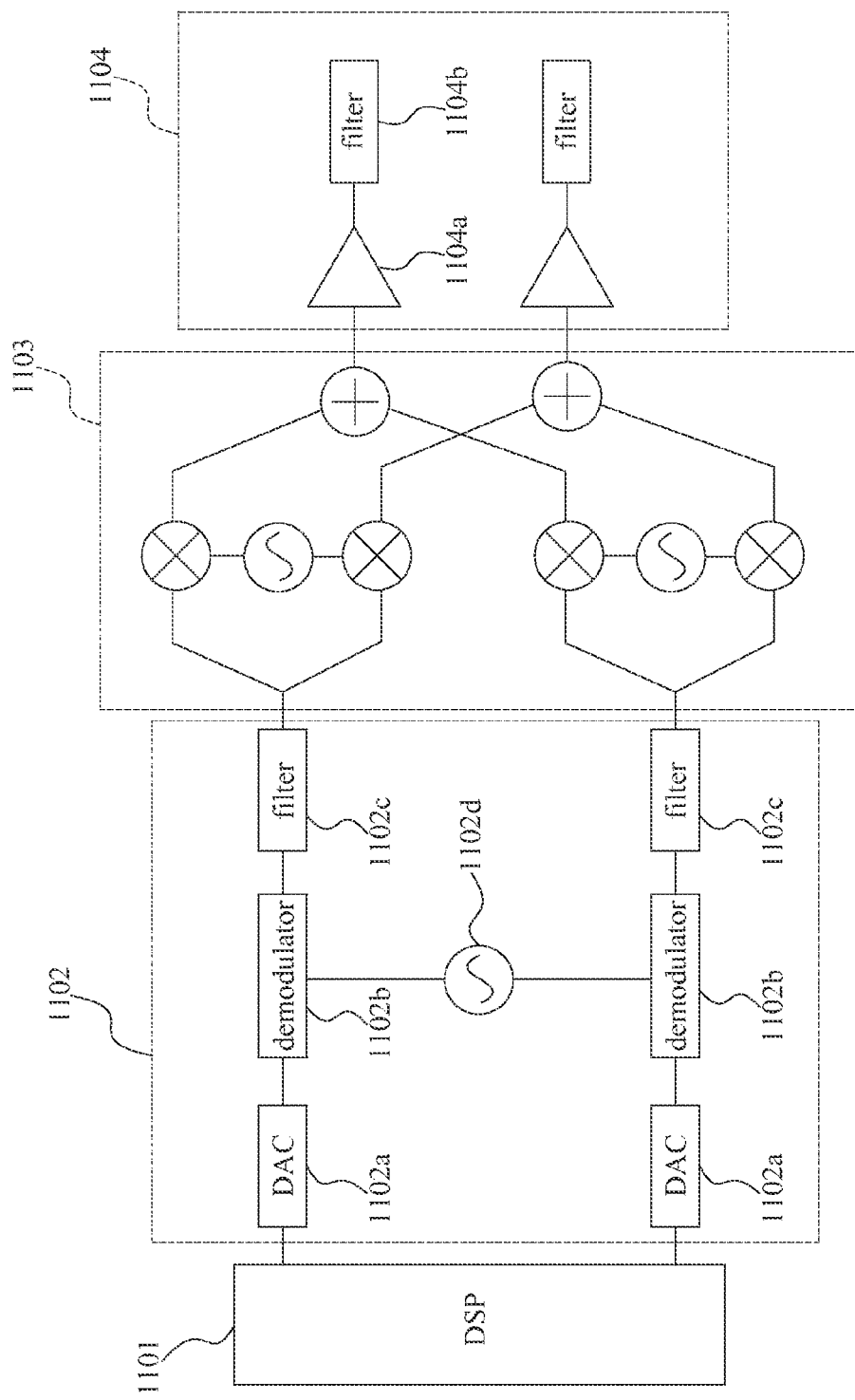
FIG. 11 shows a schematic view of a specific embodiment of the transmitter apparatus in FIG. 3.

FIG. 11 shows a schematic view of a specific embodiment of the transmission in FIG. 3. As shown in FIG. 11, the third signal processing unit 1102 corresponds to the second signal processing unit 1004 in FIG. 10. The difference is that, in the third signal processing unit 1102, the signal passes a digital-to-analog converter (DAC) 1102a, a demodulator 1102b and then a filter 1102c. Similarly, the fourth signal processing unit 1104 corresponds to the first signal processing unit 1002 in FIG. 10. The difference is that, in the fourth signal processing unit 1004, the signal passes the amplifier 1104a and then a filter 1104b.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A receiver apparatus for carrier aggregation, comprising:
at least an antenna,
a first signal processing unit,
a routing mixer device,
a second signal processing unit and
a digital signal processor (DSP);
wherein
the at least an antenna being configured to receive signals;
the first signal processing unit being connected to the at least an antenna and configured to process the signals received by the at least an antenna, the processing by the first signal processing unit comprising overclocking, downclocking, noise suppression, and increasing and lowering of signal level;
the routing mixer device further including a plurality of mixer modules and a plurality of current/voltage adders, configured to output none, one or any number of outputs at the current/voltage adders by controlling ON and OFF of the mixers;
the second signal processing unit being connected to the routing mixer device and configured to process signals from the routing mixer device, the processing by the second signal processing unit including overclocking, downclocking, noise suppression, increasing and lowering of signal level, signal demodulation, and signal domain conversion; and
the DSP being connected to the second signal processing unit and configured to perform subsequent signal processing.

2. The receiver apparatus for carrier aggregation as claimed in claim 1, wherein each mixer module comprises
a first mixer having two input terminals,
a second mixer having two input terminals and a signal synthesizer;
the two input terminals of the first mixer being connected respectively to a first input signal and the signal synthesizer;
the two input terminals of the second mixer being connected respectively to a second input signal and the signal synthesizer;
the first mixer mixing the first input signal and signal from the signal synthesizer and outputting a first output signal; and
the second mixer mixing the second input signal and signal from the signal synthesizer and outputting a second output signal.

3. The receiver apparatus for carrier aggregation as claimed in claim 2, wherein
each mixer module further disposes a switch respectively on the path of the first output signal and the path of the second output signal; and
carrier aggregation is achieved by controlling the switches to switch signal transmission path.

4. The receiver apparatus for carrier aggregation as claimed in claim 2, wherein
each mixer module further disposes a switch respectively between the signal synthesizer and the first mixer, and between the synthesizer and the second mixer; and
carrier aggregation is achieved by controlling the switches to switch the signal of signal synthesizer.

5. The receiver apparatus for carrier aggregation as claimed in claim 2, wherein each mixer module achieves carrier aggregation by various combinations of turning on the first mixer and the second mixer.

6. The receiver apparatus for carrier aggregation as claimed in claim 1, wherein the first signal processing unit comprises a filter and an amplifier, connected serially.

7. The receiver apparatus for carrier aggregation as claimed in claim 1, wherein the second signal processing unit comprises a filter, a demodulator and an ADC, connected serially.

8. The receiver apparatus for carrier aggregation as claimed in claim 7, wherein the second signal processing unit further comprises a signal synthesizer, connected to the demodulator and configured to perform a second downclocking.

9. A transmitter apparatus for carrier aggregation, comprising:
a digital signal processor (DSP),
a third signal processing unit,
a routing mixer device and
a fourth signal processing unit;
wherein the DPS being configured to output signal;
the third signal processing unit being connected to the DSP and configured to process the signals outputted by the DSP, the processing by the third signal processing unit comprising overclocking, downclocking, noise suppression, increasing and lowering of signal level, signal modulation, and signal domain conversion;
the routing mixer device further comprising a plurality of mixer modules and a plurality of current/voltage adders, configured to output none, one or any number of outputs at the current/voltage adders by controlling ON and OFF of the mixers;
the fourth processing unit being connected to the routing mixer device and configured to process signals from the routing mixer device, the processing by the fourth signal processing unit comprising overclocking, downclocking, noise suppression, and increasing and lowering of signal level; and
the signal processed by the fourth processing unit being fed to antenna for transmission.

10. The transmitter apparatus for carrier aggregation as claimed in claim 9, wherein each mixer module comprises
a first mixer having two input terminals,
a second mixer having two input terminals and
a signal synthesizer;
the two input terminals of the first mixer being connected respectively to a first input signal and the signal synthesizer;
the two input terminals of the second mixer being connected respectively to a second input signal and the signal synthesizer;
the first mixer mixing the first input signal and signal from the signal synthesizer and outputting a first output signal; and
the second mixer mixing the second input signal and signal from the signal synthesizer and outputting a second output signal.

11. The transmitter apparatus for carrier aggregation as claimed in claim 10, wherein
each mixer module further disposes a switch respectively on the path of the first output signal and the path of the second output signal; and
carrier aggregation is achieved by controlling the switches to switch signal transmission path.

12. The transmitter apparatus for carrier aggregation as claimed in claim 10, wherein
each mixer module further disposes a switch respectively between the signal synthesizer and the first mixer, and between the synthesizer and the second mixer; and
carrier aggregation is achieved by controlling the switches to switch the signal of signal synthesizer.

13. The transmitter apparatus for carrier aggregation as claimed in claim 10, wherein each mixer module achieves carrier aggregation by various combinations of turning on the first mixer and the second mixer.

14. The transmitter apparatus for carrier aggregation as claimed in claim 9, wherein the third signal processing unit comprises an DAC, a demodulator and a filter, connected serially.

15. The transmitter apparatus for carrier aggregation as claimed in claim 9, wherein the fourth signal processing unit comprises an amplifier and a filter, connected serially.

16. The transmitter apparatus for carrier aggregation as claimed in claim 14, wherein the third signal processing unit further comprises a signal synthesizer, connected to the demodulator.

17. A transceiver apparatus for carrier aggregation, comprising:
a receiver apparatus for carrier aggregation and a transmitter apparatus for carrier aggregation; wherein
the receiver apparatus for carrier aggregation further comprising:
at least an antenna,
a first signal processing unit,
a first routing mixer device,
a second signal processing unit and
a first digital signal processor (DSP); wherein
the at least an antenna being configured to receive signals;
the first signal processing unit being connected to the at least an antenna and configured to process the signals received by the at least an antenna, the processing by the first signal processing unit comprising overclocking, downclocking, noise suppression, and increasing and lowering of signal level;
the first routing mixer device further including a plurality of mixer modules and a plurality of current/voltage adders;
the second signal processing unit being connected to the routing mixer device and configured to process signals from the routing mixer device, the processing by the second signal processing unit including overclocking, downclocking, noise suppression, increasing and lowering of signal level, signal demodulation, and signal domain conversion; and
the first DSP being connected to the second signal processing unit and configured to perform subsequent signal processing; and
the transmitter apparatus for carrier aggregation further comprising:
a second digital signal processor (DSP),
a third signal processing unit,
a second routing mixer device and
a fourth signal processing unit; wherein
the second DPS being configured to output signal;
the third signal processing unit being connected to the DSP and configured to process the signals outputted by the DSP, the processing by the third signal processing unit comprising overclocking, downclocking, noise suppression, increasing and lowering of signal level, signal modulation, and signal domain conversion;
the second routing mixer device further comprising a plurality of mixer modules and a plurality of current/voltage adders, configured to output none, one or any number of outputs at the current/voltage adders by controlling ON and OFF of the mixers;

the fourth processing unit being connected to the routing mixer device and configured to process signals from the routing mixer device, the processing by the fourth signal processing unit comprising overclocking, downclocking, noise suppression, and increasing and lowering of signal level; and the signal processed by the fourth processing unit being fed to antenna for transmission.

\* \* \* \* \*